Patented Mar. 30, 1948

2,438,520

UNITED STATES PATENT OFFICE 2,438,520

POLYMERS OF UNSATURATED OXYSILICOLS

Norman P. Robie and Fred E. Sheibley, Lewiston, N. Y., assignors to The Carborundum Company, Niagara Falls, N. Y., a corporation of Delaware No Drawing. Application March 15, 1943, Serial No. 479,218

9 Claims. (Cl. 260—83)

This invention relates to new and useful compositions of matter and to methods of preparation of the same. More particularly, it relates to resinous compositions formed by the polymerization of organic silicon compounds with or without the copolymerization therewith of other monomeric materials of resin-forming habit.

It is known that silicon resins have been made in the past by processes involving Grignard reagents, processes which, however, have proven too costly for wide spread commercial adaptation. The resins prepared by Grignard reactions also are characterized by the attachment of the carbon atoms of the alkyl or aryl groups directly to the silicon atoms.

It has also heretofore been known to make certain organic ortho esters of silicon, which have been found to be polymerizable only with difficulty, and have been used as mold coatings in which application they have broken down to provide a thin film of silica. Other silicon ortho esters have been polymerized satisfactory only by joint use with polymerizing substances.

It is an object of the present invention to provide organic silicon compounds which are capable of being readily polymerized alone to form resins and further will copolymerize readily with other monomeric materials to form highly viscous or solid resinous products. It is a further object to provide organic silicon compounds of facile resin-forming habit which will have a high silicon content and as a consequence thereof will be of increased solvent and heat resistance. Still another object is the provision of practical and economical methods of preparation of organic silicon compounds of facile resin-forming habit. These and other objects and advantages ancillary thereto will become apparent as the description of the invention proceeds.

We have found that silicon resins having a high silicon content and consequently of high solvent and heat resistance and also of facile resin-forming habit can be made by polymerizing siilcon compounds having the general formula in their hydrated state of $(RO)_n Si(OH)_{4-n}$, where R is an alkyl grouping and $n$ is a number less than 4. Generally speaking, the resins of this invention can be referred to as polymerized alkoxysilicols; usually they are unsaturated alkoxysilicols. We have discovered several unique methods of making these resins. Briefly, they are prepared by reacting a silicon compound such as a silicon halide, as for example, silicon tetrachloride, with an aliphatic alcohol, alkylene oxide or hydroxy ester to form an alkoxysilicon chloride, which in turn is hydrolyzed to produce a silicol or mixture of silicols of the above general formula. The resulting silicols are readily polymerizable by dehydration - condensation and/or straight polymerization reaction to form resins of desirable and useful characteristics. The alcohol, alkylene oxide or hydroxy ester selected for the reaction, although not necessarily, is usually one of the olefinic or unsaturated type, since by the use of compounds possessing points of unsaturation within the organic radical the resulting silicols possess a number of double bonds or points of unsaturation which provide means for copolymerization of the silicols with other monomeric materials, in addition to providing a potential means of polymerization of the silicols alone over and above the polymerization taking place through dehydration condensation action.

In accordance with the present invention the above silicon polymerization products, as previously stated, can be made in a number of different ways. One method of preparation of silicon resins of the herein described type is by the reaction of silicon tetrachloride with an unsaturated secondary alcohol. For example, one mole of silicon tetrachloride has been found to react with approximately 1¼ moles of methylvinylcarbinol (butene-1-ol-3) to form methylvinylcarbinoxysilicols which are readily polyymerizable alone, or which can be polymerized jointly with other monomeric materials, such as vinyl compounds, to form resinous silicon polymerization products.

It would normally be expected that a reaction of silicon tetrachloride with an alcohol such as methylvinylcarbinol, would follow the usual esterification pattern expressed generically, where R is the characteristic alkyl grouping of the alcohol, as

$$SiCl_4 + 4ROH \rightarrow Si(OR)_4 + 4HCl$$

to form the orthosilicate of the alcohol. We have found that this does not hold for unsaturated secondary alcohols of the character of methylvinylcarbinol, as evidenced by the fact that a little over 1¼ moles of methylvinylcarbinol reacts with 1 mole of silicon tetrachloride. Further, the resinous liquid obtained from the reaction of methylvinylcarbinol and silicon tetrachloride contains at least 35% of silica, whereas the theoretical amount of silica which would be present had tetramethylvinylcarbinyl orthosilicate been formed, would have been 19.2%.

Instead of the methylvinylcarbinol, other unsaturated secondary alcohols can be similarly used, such as 2-methylpentene-2-ol-4, pentene-1-ol-3 and 2-methylpentene-1-ol-4. Also in place of silicon tetrachloride other silicon halides, such as silicon trichloride (Si2Cl6), silicon tetrabromide (SiBr4), silicon oxychloride (Si2OCl6), diethylsilicon dichloride ((C2H5)2SiCl2), silicochloroform (SiHCl3) and the like may be used.

A second method of preparation of silicon resins in accordance herewith is by the reaction of a silicon halide with an unsaturated hydroxy ester, or an unsaturated hydroxy ether. For example, silicon tetrachloride can be reacted with ethylene glycol monomethacrylate to yield readily polymerizable compounds, ethylene glycol monomethacrylate silicols,

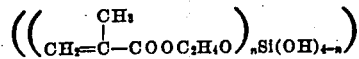

which can also be termed as methacryloxyethoxysilicanols.

Generically, the silicols so formed by reaction of unsaturated hydroxy esters or ethers with a silicon halide likewise conform, prior to the dehydration which is believed to constitute one mechanism of the polymerization, to the general formula $(RO)_nSi(OH)_{4-n}$, in which case R represents the characteristic organic grouping of the specific unsaturated hydroxyester or ether employed, and $n$ remains as a number less than 4. As in the case of the unsaturated alkoxysilicols formed by the first method, the unsaturated hydroxy ester and unsaturated hydroxy ether silicols hereby formed possess points of unsaturation which permit the copolymerization of the silicols with other monomeric materials such as vinyl compounds and the like to form a number of resinous polymerization products of varied characteristics. Other unsaturated or olefinic hydroxy esters which can be used in place of ethylene glycol monomethacrylate are the glycerol dimethacrylates and diethylene glycol mono acrylate. Unsaturated hydroxy ethers which can be so used include ethylene glycol monovinyl ether, diethylene glycol monovinyl ether, and glycerol divinyl ether.

By a modified method of preparing silicon compounds of the hereinabove described type, a silicon halide can be reacted with a saturated or unsaturated alcohol in such stoichiometric proportions and under such controlled conditions as to produce as an intermediate product, an alkoxysilicon chloride responding to the general formula $(RO)_nSiCl_{(4-n)}$, where R is the characteristic radical of the specific alcohol used, and $n$ is a number less than 4. The resulting alkoxysilicon chloride is then hydrolyzed to produce the corresponding alkoxysilicol which will respond to the generic formula given for the alkoxysilicols formed by the first method set forth above and likewise is readily polymerizable alone. When the particular alcohol employed is unsaturated the resulting silicols contain double bonds or unsaturation points which render them copolymerizable with other monomeric materials. In carrying out the preparation of silicols by this procedure the stoichiometric proportions of the reacting ingredients are so chosen that the amount of alcohol wtih respect to the amount of silicon tetrachloride will be such that the silicon tetrachloride will be only partially esterified whereby there will remain one or more atoms of chlorine still attached to the silicon. In other words, there should be no more than three moles of alcohol for each mole of silicon tetrachloride used.

In conducting this method it is also essential that the water which is subsequently introduced be controlled and limited to the amount stoichiometrically necessary for bringing about the hydrolysis of the alkoxysilicon chloride formed by reaction of the alcohol and the silicon halide. This water for hydrolysis is added as a solution in dry ether; during the hydrolysis it is necessary that the water be completely dissolved in the ether, for the presence of even a small amount of an aqueous phase causes an immediate precipitation of silica.

It has also been found that, instead of reacting various alcohols with silicon halides as set forth above, the reaction of a silicon halide upon an alkylene oxide produces a resinous silicon polymerization product similar to that produced by reaction of a silicon halide upon the corresponding alcohol. For example, silicon tetrachloride reacts with propylene oxide to produce a chloride believed to be beta-chloroisopropoxysilicon trichloride, although it is possible that an isomer may be present in small amounts. This latter named compound then hydrolyzes to form a silicol, beta-chloroisopropoxysilicol, which polymerizes to form a resinous product similar to that formed by the reaction of silicon tetracholride upon beta-chloroisopropyl alcohol. The reaction employing an alkylene oxide, such as the propylene oxide mentioned above, ethylene oxide, or epichlorohydrin, has the advantage that hydrochloric acid is not formed as a by-product.

In order that the invention may be more clearly understood, and for illustrative purposes, the following examples are set forth giving the detailed practice to be employed in carrying out the invention. Unless otherwise stated all parts are to be considered as parts by weight.

*Example I*

101 parts of silicon tetrachloride are placed in a container provided with a dropping funnel and a reflux condenser. One end of a drying tube is attached to the top of the condenser, the other to a suitable connection leading the evolved hydrochloric acid gas to water where it is absorbed. Provision is made to prevent the water from sucking back into the reaction chamber. 174 parts of methylvinylcarbinol are placed in the dropping funnel and allowed to feed slowly into the silicon tetrachloride. Hydrochloric acid gas is evolved which cools the reaction mixture during the first stages of the reaction. Cooling may be applied to the reaction chamber near the end of the reaction. The reaction mixture is agitated periodically during the addition of the alcohol. The product so obtained is stripped of volatiles in a vacuum, with a gradual temperature rise to 75.5° C. A light yellow, clear, slightly viscous liquid, resinous syrup remains. The volatiles collected in the receiver can be identified as a mixture of crotyl chloride and methylvinylcarbinyl chloride plus any excess methylvinylcarbinol. The crotyl chloride probably results from an allylic rearrangement.

The resulting silicon resin syrup has the following unusual properties. On continued heating in vacuum its viscosity increases until it becomes a sticky solid. When the silicon resin syrup is heated strongly up to 250° C. while bubbling air through it, the syrup thickens rapidly to a soft gel. The silicon resin syrup heated in an oven at 300° F. sets to a brittle, infusible solid.

The silicon resin syrup will copolymerize with vinyl acetate monomer to give hard clear resins. It will also copolymerize readily with methyl methacrylate monomer, in fact, it copolymerizes more rapidly with methyl methacrylate than with vinyl acetate monomer. In each case, the copolymers lose their solubility in common solvents for polyvinyl acetate or polymethyl methacrylate. Also, the copolymers do not not melt or fuse, when heated to an extreme, but decompose and finally ignite leaving a residue of silica.

*Example II*

A reaction vessel is provided with a reflux condenser and stirrer. 62 parts potassium methacrylate, 80 parts ethylene chlorohydrin and 5 parts hydroquinone are placed in the reaction vessel; the mixture is maintained at 105° to 108° C. for six hours by heating in an oil bath. The contents are then cooled and 200 parts ether added. The salt is filtered off. The ether is distilled from the filtrate and the residue vacuum distilled. The fraction between 85 and 87° at 5 mm. pressure is taken as ethylene glycol monomethacrylate.

174 parts of the ethylene glycol monomethacrylate containing a trace of hydroquinone is added very slowly to 90 parts of silicon tetrachloride. Hydrochloric acid gas is evolved. The reaction product is stripped of volatiles in a vacuum up to 110° C. at 5 mm. when 58 parts of distillate is collected. This distillate appears to be a mixture of beta-chloroethyl beta-chloroisobutyrate and beta-chloroethyl methacrylate together with any excess glycol monomethacrylate. Two of the volatile constituents are polymerizable. The other, namely beta-chloroethyl beta-chloroisobutyrate, on repeated distillation loses hydrochloric acid gas to give beta-chloroethyl methacrylate. The distillate may be copolymerized with the residue but it is desirable to convert the beta chloroethyl beta-chloroisobutyrate back to beta-chloroethyl methacrylate with the elimination of hydrochloric acid gas by heat treatment as by distillation prior to using the volatile constituents as copolymerization agents with the silicon monomer in the residue. The stripped residue is taken as the silicon resin-forming monomer. It polymerizes rapidly to give a very brilliant water white resin. The resin polymer analyzes around 15% silica. Approximately two moles of the hydroxy ester have reacted with one mole of silicon tetrachloride.

Twenty parts of the freshly prepared silicon resin monomer containing a trace of hydroquinone, when mixed with 0.1 part benzoyl peroxide and heated for 1⅓ hours at 85° C. polymerizes rapidly giving a brittle colorless resin which when broken into coarse granules glistens like diamonds. Less catalyst and slower polymerization yields less brittle resins. Insufficient catalyst gives soft gels requiring higher heat and longer time for final hardening.

The silicon resin monomer also copolymerizes very readily with methyl methacrylate, styrene, vinyl acetate and other monomeric materials.

*Example III*

A solution of 292 parts of methylvinylcarbinol in 354 parts of dry ether is slowly added to a solution of 675 parts of silicon tetrachloride in 1062 parts of dry ether. Simultaneously with the addition of the methylvinylcarbinol a slow stream of dried, inert gas, such as ordinary illuminating gas dried by passage through concentrated sulphuric acid, is passed through the reaction mixture. This serves as a means of agitation and also removes most of the hydrogen chloride formed. The final reaction mixture is a clear, water-white, stable liquid and can be used immediately or allowed to stand for later use without undue change. The ether is removed by distillation on a steam bath and the liquid residue fractionally distilled. The greater part of the material consists of a colorless liquid with a pungent odor, boiling at 132° C. and is considered to be methylvinylcarbinoxysilicon trichloride. It has an approximate density of 1.16 and fumes in moist air, leaving a deposit of silica.

A solution of 15 parts of water in 2480 parts of dry ether is then added slowly with agitation to a solution of 116 parts of the methylvinylcarbinoxysilicon trichloride in 1770 parts of dry ether. A clear, homogeneous solution with a slight odor of hydrogen chloride results. Removal of the ether by distillation on a steam bath leaves a clear, colorless, viscous resinous syrup which, when spread in a thin film hardens at room temperature within an hour. The resulting resin possesses high solvent and heat resistance. It is surprisingly resistant to hot dilute hydrochloric acid, and on heating at lower temperatures it turns opaque white, then yellow, and finally becomes clear again. When heated to a dull red color it gradually becomes a vitreous black although it does not lose shape.

*Example IV*

Following the procedure employed in Example III for the preparation of methylvinylcarbinoxysilicon trichloride, but substituting 298 parts of beta-methallyl alcohol for the methylvinylcarbinol, beta-methalloxysilicon trichloride is obtained as a colorless liquid of approximate density 1.18, a boiling point of 140° C. (uncorrected) and with chemical properties similar to the methyl vinylcarbinoxysilicon trichloride. 118 parts of the beta-methalloxysilicon trichloride can be hydrolyzed in the exact manner described above for the hydrolysis of the trichloride of Example III, and with analogous results. The clear, colorless viscous resin which remains after the removal of the ether has an odor distinctly different from that of the methylvinylcarbinol product and cures more slowly at room temperatures. Application of moderate heat speeds the darkening process.

*Example V*

A solution of 364 parts of sec-butyl alcohol in 368 parts of dry ether is added slowly to 675 parts of silicon tetrachloride dissolved in 1090 parts of dry ether, the reaction mixture being agitated and the atmosphere of the reaction chamber being swept out by a slow stream of dried inert gas as described in Example III. Removal of the ether and fractional distillation yields a product estimated to be sec-butoxysilicon trichloride, a colorless liquid having an approximate density of 1.14 and an uncorrected boiling point of 139° C.

114 parts of the sec-butoxysilicon trichloride is then hydrolyzed in the same manner described above for the methylvinylcarbinoxy compound to produce a clear, water-white, viscous resin syrup which hardens upon exposure to air overnight. When spread in a thin film the syrup sets to a hard, transparent sheet of high heat-resistance.

*Example VI*

217 parts of methylvinylcarbinol dissolved in 283 parts of dry ether is slowly added to a solution of 255 parts of silicon tetrachloride in 425 parts of dry ether in the presence of a dry inert gas such as set forth in Example III. Upon completion of the reaction, removal of the ether, and fractional distillation of the residue, methylvinylcarbinoxysilicon trichloride, boiling point 132° C., and a smaller amount of what is considered to be di-methylvinylcarbinoxy-silicon dichloride, a colorless liquid having an uncorrected boiling point of 185° C. and an approximate density of 1.0, are obtained.

A solution of 3 parts of water in 566 parts of dry ether is added very slowly to 40 parts of the di-methylvinylcarbinoxysilicon dichloride dissolved in 708 parts of dry ether. The resulting clear solution is freed of ether by distillation leaving a clear, pale brown, somewhat viscous resin syrup. When this syrup is spread in a thin film on glass and thus exposed to air for a period of two days it forms a clear, hard resinous film, more soft than in the previous three examples described above, and displaying marked adhesion to the glass. The hardened resin film can be heated to a dull red color without losing its form, although it does turn opaque.

*Example VII*

To a solution of 75 parts of silicon tetrachloride in 142 parts of dry ether in a container continuously swept out by a stream of dried inert gas as in several of the preceding examples, is added slowly a solution of 58 parts of ethylene glycol monomethacrylate in 142 parts of dry ether. The clear, colorless solution thus prepared is then treated by the slow addition of 910 parts of ether saturated with water at room temperature. A comparatively small amount of silica which precipitates in the early stages of the treatment is removed by filtration. Distillation of the ether from the reaction mixture at the conclusion of the treatment leaves as a residue from the filtrate a clear, slightly viscous liquid with a slightly yellowish tint. When this viscous liquid is heated with a trace of benzoyl peroxide at 80° C. for two hours it hardens to a solid resinous product. Without the benzoyl peroxide catalyst it sets at 80° C. overnight to a clear, soft rigid gel; at room temperature it assumes a higher viscosity in a few days. The silicon resin product is suspected of polymerizing not only by a dehydration reaction taking place, but also is partially polymerized through the points of unsaturation present in the organic radical within its structure.

*Example VIII*

A solution of 85 parts of propylene oxide in 142 parts of dry ether is added slowly to a solution of 250 parts of silicon tetrachloride in 213 parts of dry ether. This method is different from the several preceding examples in that no hydrogen chloride is evolved. Upon removal of the ether and fractionation of the residue at the conclusion of the reaction set forth above, there is obtained a colorless liquid of approximate density 1.3 and having an uncorrected boiling point of 161–162° C., and assumed to be beta-chloroisopropoxysilicon trichloride. This assumption is based upon the fact that upon hydrolysis with an excess of water it yields silica and beta-chloroisopropyl alcohol, boiling point 127° C.

13 parts of the beta-chloroisopropoxysilicon trichloride dissolved in ether, reagent grade, is treated by the slow addition thereto of 119 parts of saturated moist ether diluted with ether, reagent grade. The clear liquid which results is then distilled on a steam bath to remove the ether, leaving as a residue a pale yellow, viscous resinous syrup which hardens rapidly in air.

Regardless of what the exact mechanism of the polymerization reaction is, we have found that silicon resins of facile resin-forming habit, and which not only are polymerizable alone but also can be copolymerized with various ethenoid monomers, are obtained by performance of reactions in accordance with the teachings typified by the above examples. It is therefore not desired to be confined or limited to any particular theory of reaction. However, it is our belief that in the case of the reaction of an unsaturated secondary alcohol or an unsaturated hydroxy ester with a silicon compound such as silicon tetrachloride, that a chain of reactions takes place somewhat as follows. Using methylvinylcarbinol and silicon tetrachloride as an example, the initial reaction is (1)
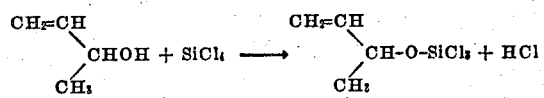

to form methylvinylcarbinoxysilicon trichloride and hydrogen chloride. While reaction 1 shows the formation of the trichloride it is probable that some dichloride

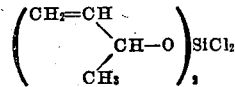

is also formed. In fact the reaction as in Example I indicates that about 1¼ moles of methylvinylcarbinol react with 1 mole of silicon tetrachloride. This shows that some of the dichloride is formed as well as the trichloride. It is doubtful that much of the monochloride was formed, if any. The hydrogen chloride thus formed reacts with more of the methylvinylcarbinol as follows:

(2) 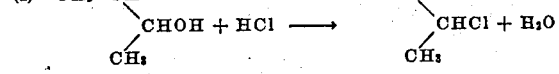

The water thus produced hydrolyzes the methylvinylcarbinoxysilicon trichloride to form the corresponding silicol according to the following reaction.

(3) 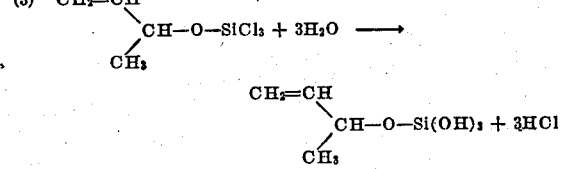

and simultaneously liberates more hydrogen chloride to enter into reaction (2). The methylvinylcarbinoxysilicol then undergoes dehydration polymerization spontaneously to give resinous polymerization products in accordance with the following reaction:

(4) 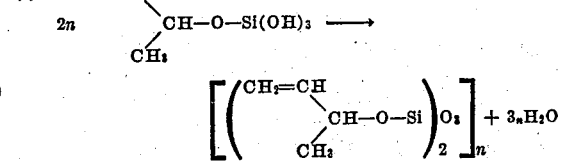

The reactions set forth above and considered to take place upon reacting methylvinylcarbinol and silicon tetrachloride may be expressed in more general terms, by substituting for the methylvinylcarbinyl radical, any alkly group, R, in the following equations:

(5) $ROH + SiCl_4 \rightarrow ROSiCl_3 + HCl$
(6) $ROH + HCl \rightarrow RCl + H_2O$
(7) $ROSiCl_3 + 3H_2O \rightarrow ROSi(OH)_3 + 3HCl$
(8) $2nROSi(OH)_3 \rightarrow [(ROSi)_2O_3]_n + 3nH_2O$ In the case of the reaction of alcohols of the methylvinylcarbinol type with silicon tetrachloride, the high velocity of the reaction (2) in which methylvinylcarbinyl chloride and water are formed provides an ample supply of water for reaction (3) whereby the trichloride of reaction (1) is quickly hydrolyzed instead of continuing to react with more of the methylvinylcarbinol. With other alcohols which are not of the methylvinylcarbinol type, reaction (2), or in more general terms, reaction (6), is much slower than it is with the methylvinylcarbinol and very little or no alkyl chlorides are formed. This results in less water being available for reaction (7) and consequently the corresponding alkoxysilicon chlorides are not hydrolyzed but tend to react with more of the alcohol to form the corresponding orthosilicates.

However, we have found that not only in the case of alcohols of the methylvinylcarbinol type but also with other type alcohols as shown by the previous Examples III to VII, and with alkylene oxides as shown by Example VIII, that by following a method whereby the alcohols are reacted with silicon tetrachloride or other silicon halides in the correct stoichiometric proportions to bring about reaction (5), after which the stoichiometrically correct amount of water is added to bring about the hydrolysis of the alkoxysilicon chlorides first produced, then resinous silicon compounds are obtained similar to those brought about by the reaction of methylvinylcarbinol and silicon tetrachloride.

Several types of polymerization are possible with these resins. For example the polymer obtained by Example I from polymerization of

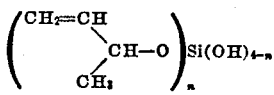

is probably a dehydration polymer containing Si—O—Si linkages. This same monomer copolymerized with vinyl acetate very likely has besides the Si—O—Si linkages additional linkages cross linking the vinyl acetate by means of the vinyl groups in the methylvinylcarbinyl radicals. This is demonstrated by the fact that minor amounts of the silicon monomer copolymerized with vinyl acetate produce a polymer which is much less fusible and soluble than pure vinyl acetate polymers.

A still different type of polymerization undoubtedly results in the polymerization of the monomer of Example II

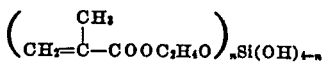

Here the tendency for polymerization through the unsaturation of the glycol methacrylate radical is so great that the polymer results more through this polymerization than through the formation of Si—O—Si linkages.

One of the advantages of this invention is that we can obtain these different types of polymerization by proper choice of monomers to obtain a wider variety of products and properties.

The various silicon resins hereby obtained are capable of many uses as adhesives for organic and inorganic materials, as well as for coating and impregnating purposes. Their high silicon content and availability in various viscosities give them a wide field of use, and make them particularly valuable where a resistance to relatively high temperatures is desirable. They may be used for impregnating cement, stone, bricks and the like, and when ground with suitable pigments such as zinc oxide, red iron oxide and magnesium oxide, provide paints of good brushing and covering ability. Such paints when baked at 240° F. for 3 hours produce hard alherent coatings.

The silicon resins of the present invention can also be used as bonds in the making of bonded abrasive products such as grinding wheels and stones, or can be applied to suitable paper, cloth or other flexible backing materials as an impregnant for the backing or as an adhesive for the attachment of the abrasive grains to the backing in the manufacture of abrasive coated products.

The silicon resins of the present invention are also useful to make electrical insulation. For example, electrical insulating tape can be made of glass fibers impregnated with a silicon resin syrup made according to the present invention and baked 1½ hours at 275° F. The pores in the glass cloth are filled with a solid resin high in silica content.

Although the various silicon resins as herein made are readily polymerizable alone and possess the maximum of heat resistance when so used they can be modified in many ways by the copolymerization with numerous other resin-forming monomeric materials. Among such resin-forming substances with which the above silicon resins can be polymerized are included vinyl compounds such as vinyl acetate, vinyl chloride, styrene, acrylic and methacrylic acids and esters such as methyl methacrylate, methacrylic acid, acrylic and methacrylic nitriles, halogen substitution products of acrylic and methacrylic acid and other similar substances.

In the specification and claims, wherever reference is made to an oxy silicol or oxysilicol, it is intended to mean and be restricted to those organic compounds of silicon in which the silicon has both organic aliphatic residual groupings and hydroxyl (OH) radicals attached to the silicon, the specified organic residual groupings being attached indirectly to the silicon through oxygen, as for example, compounds of the type covered by the general formula $(RO)_n Si(OH)_{4-n}$ set forth earlier herein.

Having described the invention, it is desired to claim:

1. As a new resin, a resinous polymerization product comprising a polymer of methylvinylcarbinoxy-silicol.

2. The resinous polymer of an organic oxysilicol, which silicol is the hydrolyzed reaction product of a silicon polyhalide and an unsaturated secondary alcohol containing a terminal vinylidene ($CH_2$=C=) grouping wherein the initial reaction product prior to hydrolysis retains a portion of the halogen of the silicon polyhalide, the residual halogen of the initial reaction product having undergone the hydrolysis.

3. The resinous polymer of an organic oxysilicol, which silicol is the hydrolyzed reaction product of a silicon polyhalide and an unsaturated hydroxy ester of a polyhydric alcohol and an olefinic carboxylic acid wherein the initial reaction product prior to hydrolysis retains a portion of the halogen of the silicon polyhalide, the residual halogen of the initial reaction product having undergone the hydrolysis.

4. The resinous polymer of an organic oxy-silicol, which silicol is the hydrolyzed reaction product of a silicon polyhalide and an alkenyl ether of a saturated polyhydric alcohol in which at least one of the hydroxyl groups is unetherified wherein the initial reaction product prior to hydrolysis retains a portion of the halogen of the silicon polyhalide, the residual halogen of the initial reaction product having undergone the hydrolysis.

5. A process of making silicon resins which comprises reacting an unsaturated secondary alcohol containing a terminal vinylidene ($CH_2{=}C{=}$)

grouping with a silicon polyhalide to form an initial reaction product retaining a portion of the halogen of the silicon polyhalide and hydrolyzing the residual halogen to form organic oxy silicols, and polymerizing the organic oxy silicols resulting from said reaction.

6. A process of making silicon resins which comprises reacting an unsaturated hydroxy ester of a polyhydric alcohol and an olefinic carboxylic acid with a silicon polyhalide to form an initial reaction product containing a portion of the halogen of the silicon polyhalide and hydrolyzing the residual halogen to form organic oxy silicols, and polymerizing the organic oxy silicols resulting from said reaction.

7. A process of making silicon resins which comprises reacting a silicon polyhalide with an unsaturated alcohol containing a terminal vinylidene ($CH_2{=}C{=}$) grouping in such stoichiometric proportions as to produce a silicon compound responding to the formula $(RO)_nSiCl_{(4-n)}$, wherein R is the characteristic radical of the alcohol and $n$ is a positive number less than 4 and within substantially the limits of 1 and 3, hydrolyzing off the residual halogen of the silicon compound of the said formula and polymerizing the hydrolyzed product to form an alkylene oxy silicon resin.

8. As a new resin, a resinous polymerization product comprising a polymer of a methacryloxy-ethoxysilicanol.

9. An organic resinous silicon polymer having the monomeric formula $(RO)_nSi(OH)_{4-n}$, said polymer being the polymer of an organic oxy silicol obtained by reacting a silicon tetrahalide with an unsaturated aliphatic monohydroxy alcohol of the formula ROH, wherein R is an unsaturated residual aliphatic grouping of the unsaturated aliphatic monohydroxy alcohol after removal of the alcoholic hydroxyl group therefrom, said aliphatic grouping in the monomeric formula containing vinylidene ($CH_2{=}C{=}$) unsaturation, the residual halogen of the initial reaction product having undergone hydrolysis, $n$ being a positive number less than 4 and within substantially the limits of 1 and 3.

NORMAN P. ROBIE.
FRED E. SHEIBLEY.

REFERENCES CITED

The following references are of record in the file of this patent:

UNITED STATES PATENTS

| Number | Name | Date |
|---|---|---|
| 1,809,755 | King | June 9, 1939 |
| 2,276,094 | Rothrock | Mar. 10, 1942 |
| 2,027,931 | Ray | Jan. 14, 1936 |
| 2,160,942 | Britton | June 6, 1939 |
| 2,253,128 | Langkammerer | Aug. 19, 1941 |
| 2,318,959 | Muskat | May 11, 1943 |
| 2,329,632 | Marsden | Sept. 14, 1943 |

FOREIGN PATENTS

| Number | Country | Date |
|---|---|---|
| 528,988 | Germany | July 6, 1931 |

OTHER REFERENCES

Signer: Annalen der Chemie, vol. 488, pp. 56, 67, 68, 72 and 73.

Hackh's Chemical Dictionary, Blakeston 1937, 2d ed., article "Alkyl," page 36.

King: Transactions, Journal Oil Color Chemists Association, Feb. 1930, vol. 13, No. 116, pages 28, 33, 36 and 42.

Chemical Rubber Publishing Co.: Handbook of Chemistry and Physics, 27th edition, 1943, page 538.

Certificate of Correction

Patent No. 2,438,520. March 30, 1948.

NORMAN P. ROBIE ET AL.

It is hereby certified that errors appear in the printed specification of the above numbered patent requiring correction as follows: Column 10, line 14, for "alherent" read *adherent*; line 60, claim 1, after the words "polymer of" insert *a*; column 11, lines 45 and 46, claim 7, strike out "an alkylene oxy silicon" and insert instead *a*; and that the said Letters Patent should be read with these corrections therein that the same may conform to the record of the case in the Patent Office.

Signed and sealed this 1st day of June, A. D. 1948.

[SEAL]

THOMAS F. MURPHY,
*Assistant Commissioner of Patents.*